(No Model.)

W. A. TURNER.
PIPE THIMBLE.

No. 435,987. Patented Sept. 9, 1890.

Witnesses
Walter S. Bowen
N. C. Steere

Inventor
William A. Turner
By his Attorney
Rufus B. Fowler

UNITED STATES PATENT OFFICE.

WILLIAM A. TURNER, OF WORCESTER, MASSACHUSETTS, ASSIGNOR TO EDMUND CONVERSE, OF SAME PLACE.

PIPE-THIMBLE.

SPECIFICATION forming part of Letters Patent No. 435,987, dated September 9, 1890.

Application filed May 13, 1890. Serial No. 351,245. (No model.)

*To all whom it may concern:*

Be it known that I, WILLIAM A. TURNER, a citizen of the United States, and a resident of Worcester, in the county of Worcester and State of Massachusetts, have invented a new and useful Improvement in Pipe-Thimbles, of which the following is a specification, reference being had to the accompanying drawings, representing a pipe-thimble embodying my invention, and in which—

Figure 1:
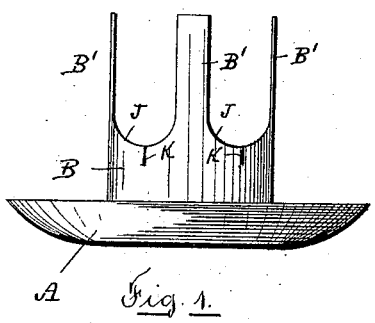
Figure 2:
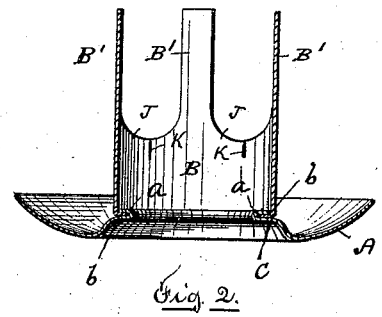
Figure 3:
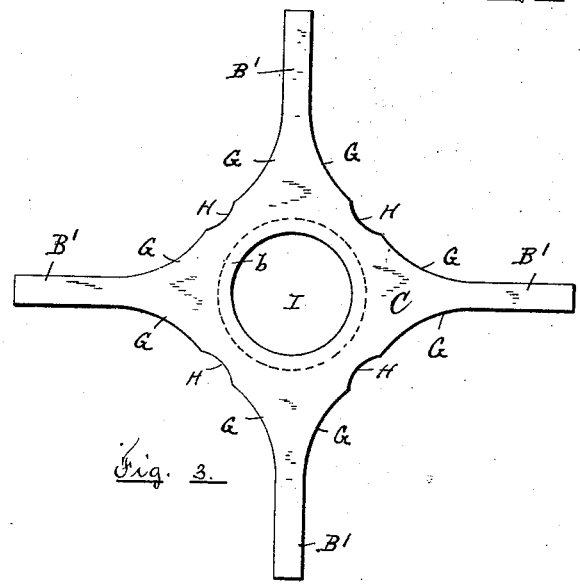
Figure 4:
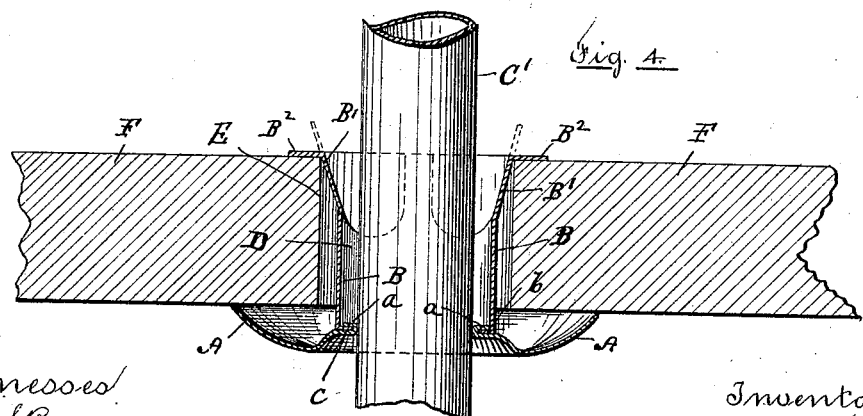

Figure 1 shows an elevation of a pipe-thimble embodying my improvement. Fig. 2 is a central vertical sectional view. Fig. 3 is a view of the blank from which the tubular portion of the thimble is formed, and Fig. 4 represents in sectional view a portion of a wall, to which one of my improved thimbles is applied, the thimble being shown in sectional view, with a section of pipe inclosed within the thimble.

Similar letters refer to similar parts in the several views.

The object of my invention is to provide a thimble for use upon steam, gas, water, and other pipes where they are carried through partition-walls.

A denotes a collar or face-plate inclosing the pipe and resting against the wall, covering the annular space around the pipe, and is stamped or pressed into any convenient form. The face-plate A has a flange $a$, formed around a central circular opening, through which the pipe passes.

B is a cylindrical tube with a flange $b$ at its lower end and turned inwardly, and with the prongs B' B' extending upward from the upper end of the cylindrical tube B. The tube B, prongs B', and flange $b$ are formed from a single piece of sheet metal cut in the form represented in Fig. 3, and which forms a blank, from which the tube B is pressed into shape by the action of properly-shaped punches and dies in the well-known manner of working sheet metal. The flange $b$ is placed upon the surface $c$ of the face-plate A and the flange $a$ is then turned over and upon the flange $b$, securely uniting the face-plate A and the tube B together. The bent flange $a$ forms a bearing for the pipe, a section of which is shown at C, Fig. 4, and the tube B is carried away from the pipe, the width of the flange $b$ forming an annular chamber D around the pipe C, preventing the tube from becoming heated by heat communicated from the pipe. The tube B is a seamless tube from the flanged end to the prongs B', affording a firm support to the face-plate A. The tube B is made smaller than the opening E through the wall F, in order to provide an annular space around the tube B and next the wall of the opening E, and the tube B is held concentrically in the opening E by means of the prongs B', which are bent outwardly against the wall of the opening E, with their ends B² turned down over the opposite face of the wall of the partition, thereby holding the face-plate A closely against the partition or wall F.

Pipe-thimbles provided with prongs which are turned over upon the face or side of the wall opposite a collar or face-plate, to which the prongs were attached, are not new, and I do not claim such; but in the construction shown in the accompanying drawings the prongs B' do not extend to the collar or face-plate A, but have interposed between the face-plate and the prongs a seamless tube B, extending partially through the wall F, forming the partitions, the prongs extending obliquely from the tube B to the wall and forming braces between the wall and the tube B. The tube B and the prongs are integral, and the tube B is a seamless tube pressed into its cylindrical shape by appropriate dies and punches from a blank, as represented in Fig. 3. The blank from which the tube B is formed is a piece of sheet metal approximating a rectangular piece having the prongs B' extending radially from each of its four corners. The lines, however, which bound the sides of the sheet-metal blank instead of being straight are curved, as at G G, the curves being tangential to the sides of the prongs, and each of the curved lines G G being united by a short curved line of less radius, as at H, Fig. 3. In the center of the blank I form a hole I, through which the pipe passes. As the blank is pressed into the form of the tube B, an internal flange $b$ is formed around the edge of the hole I, the curved sides G G are brought into the form of the curved line J, Figs. 1 and 2, and the edge at H is brought together, forming a short seam K, Figs. 1 and 2. The object of the curved edge H is to relieve the die from strain in upsetting the metal at that point.

I do not confine myself to the specific form of the metal blank as represented, as slight modifications can be made, the essential feature consisting in the use of a blank with the radially-projecting prongs and hole in the center to receive the pipe, from which the tube is pressed into the form substantially as shown in Figs. 1 and 2.

What I claim as my invention, and desire to secure by Letters Patent, is—

1. The within-described pipe-thimble, consisting of a seamless tube provided with the prongs B', and attached to a face-plate, said tube being stamped or pressed from a single sheet of metal, substantially as described.

2. The combination, in a pipe-thimble, of a face-plate A, provided with the internal flange $a$, a seamless tube B, provided with prongs B', and a flange $b$, inclosed by the flange $a$, whereby the face-plate A and flange B are united, substantially as described.

Dated at Worcester, in the county of Worcester and State of Massachusetts, the 6th day of May, 1890.

WILLIAM A. TURNER.

Witnesses:
EDMUND CONVERSE,
RUFUS B. FOWLER.